US011966866B2

(12) United States Patent
Fu et al.

(10) Patent No.: US 11,966,866 B2
(45) Date of Patent: Apr. 23, 2024

(54) PROVIDING RESOURCE ACCESS

(71) Applicant: Kyndryl, Inc., New York, NY (US)

(72) Inventors: Guo K. Fu, Beijing (CN); De Shou Kong, Beijing (CN); Hua Li, Beijing (CN); Rui Wang, Beijing (CN); Wen Jing Wang, Beijing (CN)

(73) Assignee: KYNDRYL, INC., New York, NY (US)

(*) Notice: Subject to any disclaimer, the term of this patent is extended or adjusted under 35 U.S.C. 154(b) by 1318 days.

(21) Appl. No.: 14/262,875

(22) Filed: Apr. 28, 2014

(65) Prior Publication Data
US 2015/0006431 A1 Jan. 1, 2015

(30) Foreign Application Priority Data
Jun. 28, 2013 (CN) .......................... 201310269546.2

(51) Int. Cl.
*G06Q 10/0631* (2023.01)
*G06Q 10/105* (2023.01)
*H04L 9/40* (2022.01)

(52) U.S. Cl.
CPC ....... *G06Q 10/0631* (2013.01); *G06Q 10/105* (2013.01); *H04L 63/20* (2013.01)

(58) Field of Classification Search
CPC .... G06Q 10/103; G06Q 10/101; G06Q 50/01; G06Q 10/0631; G06Q 10/105; H04L 63/20
USPC .................................................. 705/300, 301
See application file for complete search history.

(56) References Cited

U.S. PATENT DOCUMENTS 7,313,564 B2 * 12/2007 Melamed ............ G06F 11/3684
707/999.01
7,877,391 B2    1/2011 Bird et al.
8,271,326 B1 *  9/2012 Brunet ............... G06Q 30/0214
705/14.16
(Continued)

FOREIGN PATENT DOCUMENTS

CN     100444121 C  * 12/2008
CN     101489107       7/2009
(Continued)

OTHER PUBLICATIONS

R. F. Freund et al., "Scheduling resources in multi-user, heterogeneous, computing environments with SmartNet," Proceedings Seventh Heterogeneous Computing Workshop (HCW'98), Orlando, FL, USA, 1998, pp. 184-199 (Year: 1998).*
(Continued)

*Primary Examiner* — Gerardo Araque, Jr.
(74) *Attorney, Agent, or Firm* — Erik Swanson; Andrew M. Calderon; Calderon Safran & Cole, P.C (57) ABSTRACT

A method and system for providing access to a resource. A request for an individual within an organization to access the resource is received. In response to the request having been received, at least one constraint for accessing the resource by the individual is ascertained, based on respective constraints for accessing the resource by one or more other individuals in the organization. The one or more other individuals have a same role in the organization as the individual or have a respective relationship with the individual. The at least one constraint is provided to the individual.

3 Claims, 5 Drawing Sheets

(56) References Cited

U.S. PATENT DOCUMENTS

| | | | |
|---|---|---|---|
| 8,443,005 B1* | 5/2013 | Goldman | G06Q 50/01 707/798 |
| 2002/0007340 A1* | 1/2002 | Isaf | G06Q 30/02 705/37 |
| 2004/0128322 A1* | 7/2004 | Nagy | G06Q 10/10 |
| 2005/0055266 A1* | 3/2005 | Foth | G06Q 30/0203 705/7.32 |
| 2005/0192902 A1* | 9/2005 | Williams | G06F 21/10 705/51 |
| 2006/0200432 A1 | 9/2006 | Flinn et al. | |
| 2007/0174101 A1* | 7/2007 | Li | G06Q 10/06 705/7.26 |
| 2008/0040674 A1 | 2/2008 | Gupta | |
| 2009/0222522 A1* | 9/2009 | Heaney | G06Q 10/107 709/206 |
| 2009/0276771 A1* | 11/2009 | Nickolov | G06F 9/4856 717/177 |
| 2010/0257028 A1* | 10/2010 | Hillerbrand | G06Q 10/067 705/319 |
| 2013/0212479 A1* | 8/2013 | Willis | G06Q 10/10 715/736 |
| 2014/0005972 A1* | 1/2014 | Gamble | G06F 11/2221 702/122 |
| 2014/0129631 A1* | 5/2014 | Jayaram | G06Q 50/01 709/204 |

FOREIGN PATENT DOCUMENTS

| | | | |
|---|---|---|---|
| CN | 101828167 | 9/2010 | |
| CN | 102438205 | 5/2012 | |
| CN | 103106285 | 5/2013 | |
| WO | WO-02097588 A2 * | 12/2002 | G06F 8/20 |

OTHER PUBLICATIONS

J. A. Pino and H. A. Mora, "Scheduling meetings with guests' approval," Proceedings 17th International Conference of the Chilean Computer Science Society, Valparaiso, Chile, 1997, pp. 182-189 (Year: 1997).*

M. Andersson, H. Grimm, A. Persson and Amos Ng, "A web-based simulation optimization system for industrial scheduling," 2007 Winter Simulation Conference, Washington, DC, 2007, pp. 1844-1852 (Year: 2007).*

Anonymous "PalmSource Launches Inside Track Program for Developers," PR Newswire, pp. 1, May 24, 2005 (Year: 2005).*

T. Salais-Fierro, "Neuro-Genetic Approach to Job Shop Scheduling Problem." Order No. 3129903, New Mexico State University, Ann Arbor, May 2004 (Year: 2004).*

Babaian et al., Leveraging Usage History to Support Enterprise System Users, 10 pages, International Conference on Enterprise Information Systems (ICEIS), ISBN-13: 978-989-8565-12-9, 2012.

Information Materials for IDS, OA date: Jan. 16, 2017, 2 Pages.

CN search report in English (indicated in Final Office Action); Application No. 2013102695462; date of filing: Jun. 28, 2013; 2 pages.

CN Office Action in English (indicated in Final Office Action); Application No. 2013102695462, 7 pages.

CN Office Action, 201310269546.2, dated Jan. 16, 2017, 7 Pages.

CN Search Report, 201310269546.2, dated Jan. 5, 2017, 7 Pages.

* cited by examiner

PROVIDING RESOURCE ACCESS

TECHNICAL FIELD

The present invention relates to the technical field of data resource access, and more specifically, to a method and system for providing guidance data in response to a resource access request by using structured role model data.

BACKGROUND

Currently to execute a certain task, a user within an enterprise or a public network has to access corresponding resource data and perform corresponding operations, and needs relevant guidance on how to access resources and how to perform operations. For example, with respect to a new employee of an enterprise, when he/she applies for a leave for the first time, he/she needs permission to access the human resources (HR) system and should provide approval from a competent manager according to the enterprise's specified process. However, this new employee has no idea about which resource to access; even if he/she knows the resource to be accessed, he/she has no idea about how to operate and which process to follow. In a word, new users do not know they should apply for access permission of which resource, how they apply for access permission, how they perform operations after obtaining access permission, and to whom they can resort for guidance.

A solution in the prior art usually provides prior written guidance. However, employees have to spend a lot of time looking up a proper portion in the written guidance, which results in quite low efficiency. Moreover, due to change of enterprises' internal policy, contents of the written guidance might be out of date and hard to be updated in time. Another solution in the prior art is that an employee seeks help from other experienced employees. However, he/she does not know those experts in a specific field and thus cannot find a proper person to get help in time.

BRIEF SUMMARY

The present invention provides a method for providing access to a resource, said method comprising:

receiving, by a processor of a computer system, a request for an individual within an organization to access the resource;

in response to said receiving the request, said processor ascertaining at least one constraint for accessing the resource by the individual, based on constraints for accessing the resource by one or more other individuals in the organization, wherein the one or more other individuals have a same role in the organization as the individual or have a respective relationship with the individual; and said processor providing the at least one constraint to the individual.

The present invention provides a computer program product, comprising a computer readable storage hardware device having computer readable program code stored therein, said program code containing instructions which, upon being executed by a processor of a computer system, implement a method for providing access to a resource, said method comprising said processor receiving a request for an individual within an organization to access the resource;

in response to said receiving the request, said processor ascertaining at least one constraint for accessing the resource by the individual, based on constraints for accessing the resource by one or more other individuals in the organization, wherein the one or more other individuals have a same role in the organization as the individual or have a respective relationship with the individual; and said processor providing the at least one constraint to the individual.

The present invention provides a computer system comprising a processor, a memory coupled to the processor, and a computer readable storage device coupled to the processor, said storage device containing program code configured to be executed by the processor via the memory to implement a method for providing access to a resource, said method comprising:

said processor receiving a request for an individual within an organization to access the resource;

in response to said receiving the request, said processor ascertaining at least one constraint for accessing the resource by the individual, based on constraints for accessing the resource by one or more other individuals in the organization, wherein the one or more other individuals have a same role in the organization as the individual or have a respective relationship with the individual; and said processor providing the at least one constraint to the individual.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

One object of the present invention is to provide a method and system for automatically providing guidance data for resource access.

According to one aspect of the present invention, there is provided a method for providing resource access, the method comprising: receiving from an individual an access request for resources; and providing to the individual guidance data for accessing the resources based on role model data, so as to build an association between the individual and the resources, wherein the role model data comprise structured data that are generated by aggregating access data according to role attributes and behavior attributes.

According to another aspect of the present invention, there is provided a system for providing resource access, the system comprising: request receiving means configured to receive from an individual an access request for resources; and guidance data providing means configured to provide to the individual guidance data for accessing the resources based on role model data, so as to build an association between the individual and the resources, wherein the role model data comprise structured data that are generated by aggregating access data according to role attributes and behavior attributes.

According to the method or system provided by the present invention, guidance data for resource access may be provided to a user rapidly, and in some cases guidance data for resource access may be provided using the user's own relationship network data, thereby increasing the efficiency of resource access.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product comprising one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Figure 1:
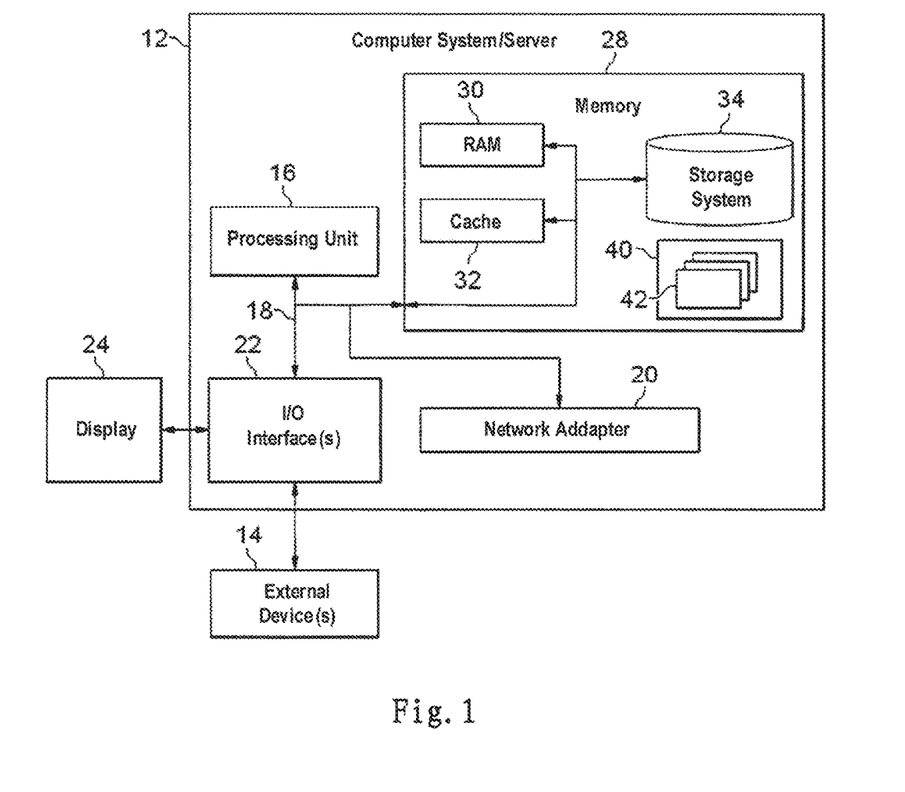
FIG. 1 shows a block diagram of an exemplary computer system 100 which is applicable to implement the embodiments of the present invention.

Referring now to FIG. 1, in which a block diagram of an exemplary computer system/server 12 which is applicable to implement the embodiments of the present invention is illustrated. Computer system/server 12 illustrated in FIG. 1 is only illustrative and is not intended to suggest any limitation as to the scope of use or functionality of embodiments of the invention described herein.

As illustrated in FIG. 1, computer system/server 12 is illustrated in the form of a general-purpose computing device. The components of computer system/server 12 may include, but are not limited to, one or more processors or processing units 16, a system memory 28, and a bus 18 that couples various system components including system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not illustrated in FIG. 1 and typically called a "hard drive"). Although not illustrated in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

In one embodiment, the computer system 12 comprises a processor 16, a memory 30 coupled to the processor, and a computer readable storage device 34 coupled to the processor, said storage device containing program code configured to be executed by the processor via the memory to implement methods of the present invention for providing access to a resource.

In one embodiment, a computer program product comprises a computer readable hardware storage device 34 having computer readable program code stored therein, said program code containing instructions which, upon being executed by the processor 16 of the computer system 12, implement methods of the present invention for providing access to a resource.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
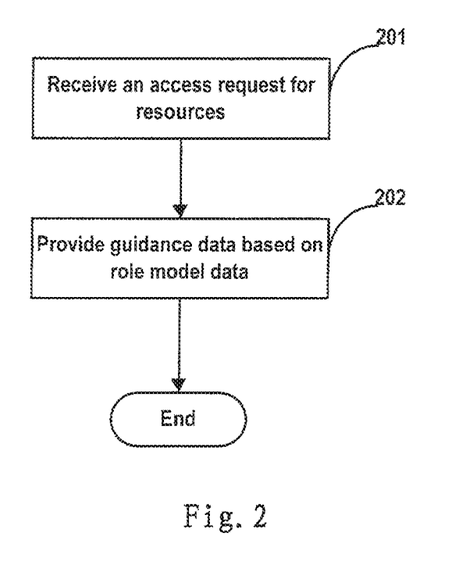
FIG. 2 shows a flowchart of a method for providing resource access according to one embodiment of the present invention.

An introduction is now given to FIG. 2. This figure shows a flowchart of a method for providing resource access according to one embodiment of the present invention.

The method shown in FIG. 2 starts from step 201, where an access request for resources from an individual is received. According to one embodiment of the present invention, the individual includes an employee within an enterprise, and the access request for resources may be a request which is made by the employee for performing a certain function of resources within the enterprise. For example, to apply for a leave, one employee in the enterprise makes a leave request to the human resources system. Here "to apply for a leave" is a function of the human resources system. According to another embodiment of the present invention, the individual includes a user within a social public network, and the access request for resources may be a request which is made by the user for performing a certain function of resources within the public network.

Next the method shown in FIG. 2 proceeds to step 202, where guidance data for accessing the resource is provided to the individual based on role model data, so as to build an association between the individual and the resource. In one embodiment, the guidance data are constraints (e.g., time, frequency, operation order, etc.) for accessing the resource.

According to one embodiment of the present invention, the role model data comprise structured data that are generated by aggregating access data according to role attributes and behavior attributes. Here the access data may be previously saved access data of all individuals. Since historical access data are discrete data records (usually arranged in temporal order), they need to be organized by data aggregation technology. Role attributes and behavior attributes are two dimensions for aggregating these access data. According to one embodiment of the present invention, role attributes may comprise predefined role-related attributes, such as job title, rank, working location, etc. The number and selection of role attributes may be customized according to internal demands of different organizations and enterprises. According to one embodiment of the present invention, behavior attributes may comprise features of operation behavior exhibited by each individual when performing a certain function of the resource, e.g. may comprise access time, frequency, operation order, etc. which are constraints for accessing the resources.

Likewise, the number and setting of behavior attributes may also be customized according to internal demands of different organizations and enterprises. After defining role attributes and behavior attributes on which data aggregation is based, aggregation operation may be performed to access data. According to one embodiment of the present invention, a result from aggregation is structured data. For example, aggregated role model data (structured data) may be represented as: "role 1 (senior manager, Beijing)—access system A to execute software test from 25$^{th}$ to 28$^{th}$ of each month." Here, role 1 (senior manager, Beijing) represents structured data formed by aggregating a plurality of historical access data according to two role attributes, job title (senior manager) and working location (Beijing), and two behavior attributes, access system (system A) and access time (from 25$^{th}$ to 28$^{th}$ of each month).

Figure 4:
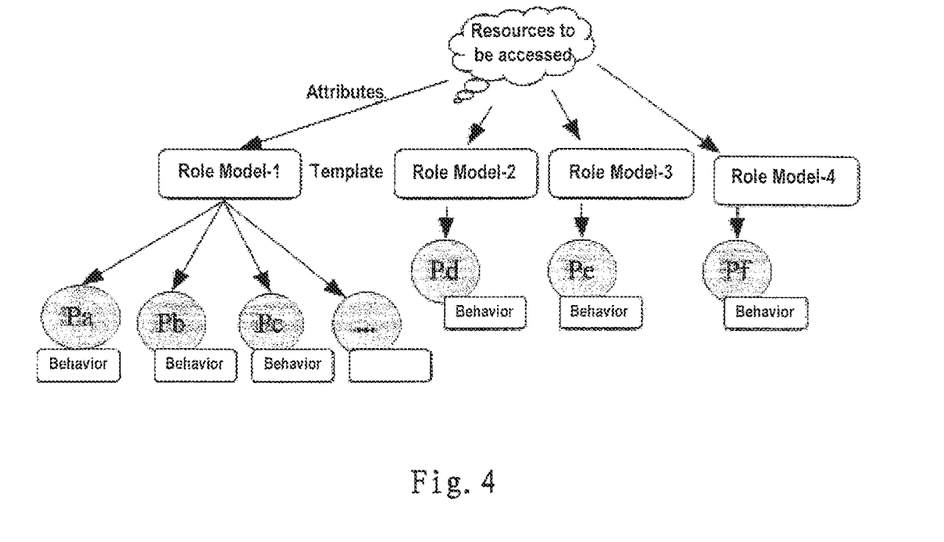
FIG. 4 shows a schematic view of structured role model data that have been generated by aggregating access data according to one embodiment of the present invention.

FIG. 4 shows a schematic view of structured role model data generated by aggregating access data according to one embodiment of the present invention. As shown in FIG. 4, with respect to "resource to be accessed," there are four role models: role model-1 to role model-4, each of which may be interpreted as model data generated by abstracting (data-aggregating) access data according to role attributes (at this point model data are merely a result of abstraction according to role attributes, not final role model data). Further, with respect to each role model, data of each individual are abstracted (data-aggregated) according to a dimension "behavior". For example, role model-1 contains behavior data of a plurality of individuals, Pa, Pb, Pc, etc. Final structured role model data are generated by abstracting access data by using two dimensions. Note one role (aggregation of role attributes) might correspond to a plurality of role data models. As a person in the same role might have different behavior attributes when performing different functions or work, separate aggregation is required. For example, regarding the senior managers in Beijing being engaged in software test and applying for a leave, two role data models need to be aggregated.

Note data aggregation is technical means for folding, grouping and summarizing data, and it belongs to solutions in the prior art, which is not detailed here. The present invention is not intended to limit the specific data aggregation technology being adopted. Moreover, different role attributes and behavior attributes may be defined according to different requirements on tolerance of data difference and aggregation precision.

Further it should be noted that aggregated role model data may already exist as one part of historical data, i.e. data aggregation operation in real-time operation is not needed. The present invention is not intended to limit the time when role model data is generated by aggregating access data.

In step 202, suppose there already exists aggregated role model data "role 1 (senior manager, Beijing)—access system A to execute software test from 25$^{th}$ to 28$^{th}$ of each month," when a new senior manager accesses system A to execute software test, he/she can automatically acquire permission to access system A according to the role model data and is reminded of "access from 25$^{th}$ to 28$^{th}$ of each month." The automatic acquisition of the permission and reminder information belong to "guidance data for accessing the resource." Thus, the individual builds an association with the resource by using the guidance data.

Using the method shown in FIG. 2, guidance data for resource access can be automatically recommended to the individual based on role model data, and the speed for resource access is increased.

According to one embodiment of the present invention, the providing to the individual guidance data for accessing the resources based on role model data comprises: in response to the individual conforming to a specific role, providing to the individual role model data corresponding to the specific role as the guidance data.

According to another embodiment of the present invention, the providing to the individual guidance data for accessing the resource based on role model data comprises: in response to the individual conforming to a specific role, obtaining a candidate entity repository corresponding to the specific role; analyzing relationship network data where the individual is located, so as to determine from the candidate entity repository a valid entity for the individual; and using the determined valid entity to provide to the individual recommended guidance data of the valid entity.

Detailed description is presented below to the above two embodiments in conjunction with FIG. 3. This figure shows a flowchart of a method for providing resource access according to another embodiment of the present invention.

Figure 3:
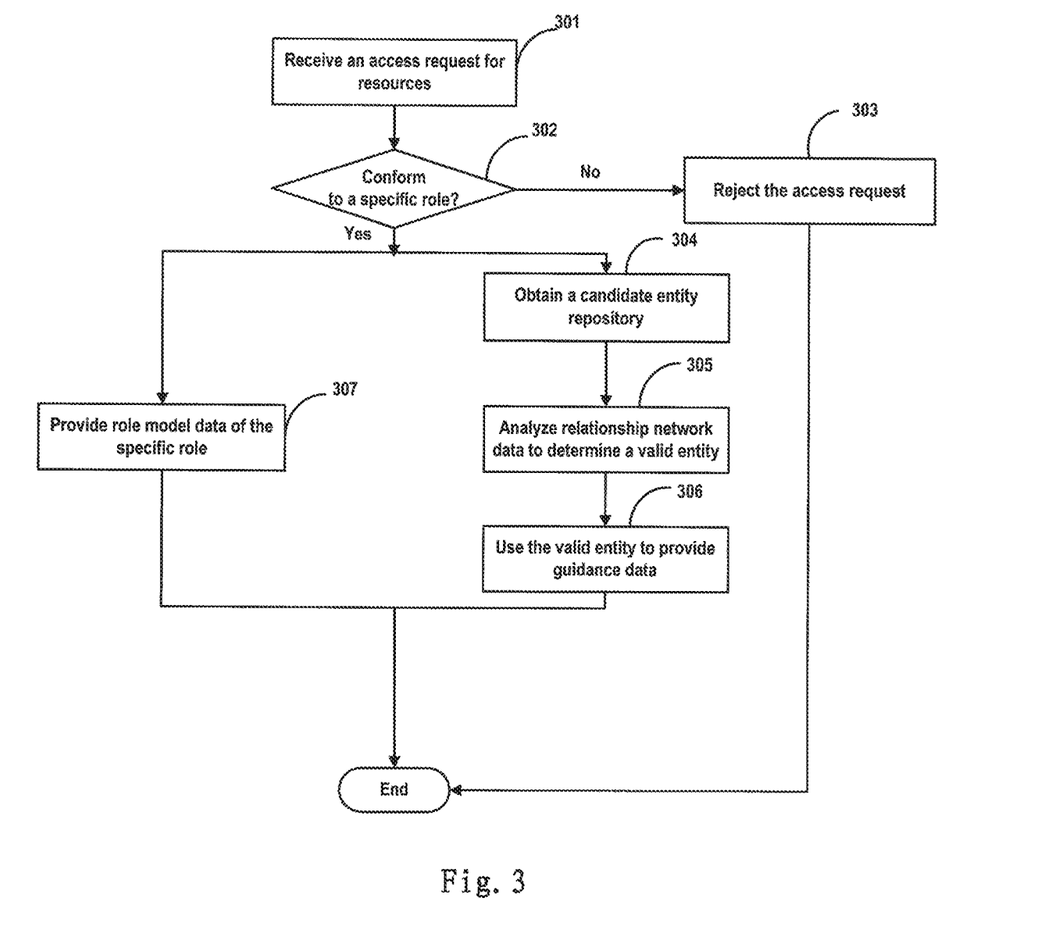
FIG. 3 shows a flowchart of a method for providing resource access according to another embodiment of the present invention.

The method shown in FIG. 3 starts from step 301, where an access request for resources from an individual within an organization is received. The request is for the individual to access the resource. This step corresponds to step 201 and thus is not detailed here.

Next in step 302, it is judged whether or not the individual conforms to a specific role in role model data. Here role description information abstracted from role model data is used for judging whether or not the individual conforms to a certain role. If a judgment result is No, then the flow proceeds to step 303, where the access request for resources from the individual is rejected.

If the judgment result in step 302 is Yes, then the flow proceeds to step 307, i.e. one of the foregoing embodiments, where role model data corresponding to the specific role is provided to the individual as guidance data. In one embodiment, the guidance data are constraints (e.g., time, frequency, operation order, etc.) for accessing the resource. That is, structured role model data aggregated in advance is directly recommended to the individual requesting resource access. Note one role (e.g. senior manager in Beijing) might correspond to various kinds of role model data. According to one embodiment of the present invention, in step 307 all role model data with role attributes of senior manager in Beijing are recommended to the individual requesting resource access, and further the individual selects concrete role model data. According to another embodiment of the present invention, in step 307 according to a concrete function request made by the individual when requesting resource access, role model data conforming to the concrete function request is selected from all role model data with role attributes of senior manager in Beijing and then is provided to the individual (e.g., by being recommended or otherwise communicated to the individual) as guidance data.

According to one embodiment of the present invention, the role model data are directly executable structured data, without the individual to interpret data meaning. According to another embodiment of the present invention, the role model data are executed after the individual interprets data meaning.

Where the judgment result in step 302 is Yes, the method shown in FIG. 3 may further proceed to step 304, where a candidate entity repository corresponding to the specific role is acquired. According to one embodiment of the present invention, the candidate entity repository comprises all individuals conforming to specific role attributes during aggregating access data. For example, while aggregating access data according to role attributes—"senior manager in Beijing" and behavior attribute—"software test," all senior managers in Beijing conducting software test belong to members of the candidate entity repository. For example, there are two raw access data as below:

1. John (senior manager, Beijing)—access system A to execute software test from 24$^{th}$ to 28$^{th}$ of each month.

2. Mike (senior manager, Beijing)—access system A to execute software test from 25$^{th}$ to 29$^{th}$ of each month.

Role model data obtained by aggregating these two raw access data might be (senior manager, Beijing)—access system A to execute software test from 25$^{th}$ to 28$^{th}$ of each month, which is an overlapping portion of the two previous raw access data, and in the meanwhile both John and Mike are added to the candidate entity repository.

Next, in step 305, relationship network data where the individual is located are analyzed so as to determine from the candidate entity repository a valid entity for the individual. According to one embodiment of the present invention, the relationship network data comprise social network data. According to another embodiment of the present invention, relationship network data comprise data reflecting relationships between individuals inside organizations and enterprises. According to still another embodiment of the present invention, the relationship network data is related to concrete field, subject or work item.

In step 305, suppose individual A making a resource access request has an association with individual B in a certain social network and individual B is in the candidate entity repository obtained in step 304, then individual B may be determined as a valid entity.

According to one embodiment of the present invention, in step 305 by analyzing relationship network data where the individual is located, relationship weights between the individual and other individuals (belonging to the candidate entity repository) in the relationship network are obtained and a valid entity is determined. Further, according to one embodiment of the present invention, relationship weights may be scored, and other individual exceeding a preset score threshold is determined as a valid entity.

Subsequently the method shown in FIG. 3 proceeds to step 306, where recommended guidance data of the valid entity is provided to the individual by using the determined valid entity. According to one embodiment of the present invention, in step 306 the valid entity as an expert is recommended as guidance data to the individual making the resource access request. According to another embodiment of the present invention, in step 306 raw access data of the valid entity is directly provided as guidance data to the individual making the resource access request. In one embodiment, the guidance data are constraints (e.g., time, frequency, operation order, etc.) for accessing the resource.

Through steps 304 to 306, by means of relationship network data of the individual, channels for providing guidance data to the individual can be effectively expanded. In particular, where there exists no aggregated role model data (because of too little samples and so on) or original role model data are unavailable due to change of the internal enterprise process, valid guidance data are provided by determining expert candidates.

Note according to one embodiment of the present invention, when the judgment result in step 302 is Yes, the flow may proceed to execute either the left branch of step 307 or the right branch of steps 304 to 306. The left and right branches may be executed concurrently or one by one without order, or it may be set that only one branch is executed.

In one embodiment, the respective execution paths of steps 307 (first path) and 304-306 (second path) provide alternative processes for ascertaining at least one constraint for accessing the requested resource by the individual, based on respective constraints for accessing the resource by one or more other individuals in the organization. The one or more other individuals have a same role (e.g., job title, rank, working location, or combinations thereof) in the organization as the individual (step 307) or have a respective relationship with the individual (steps 304-306). The at least one constraint is provided to the individual in respective steps 307 and 306 of the alternative processes.

In the process of step 307, ascertaining the at least one constraint for accessing the resource by the individual is based on constraints for accessing the resource by one or more other individuals having a same role in the organization as the individual. In one embodiment in the process of step 307, the one or more other individuals consists of a single individual, wherein it is ascertained that the at least one constraint for accessing the resource by the individual is the one or more constraints for accessing the resource by the single individual. In one embodiment in the process of step 307, the one or more other individuals consists of a plurality of other individuals, wherein it is ascertained that the at least one constraint for accessing the resource by the individual is an overlapping portion of the respective constraints for accessing the resource by the plurality of other individuals.

In the process of steps 304-306, ascertaining the at least one constraint for accessing the resource by the individual is based on constraints for accessing the resource by one or more other individuals having a respective relationship with the individual. In one embodiment in the process of steps 304-306, the one or more other individuals consists of a plurality of other individuals, wherein ascertaining that the at least one constraint for accessing the resource by the individual comprises the steps of: (i) obtaining respective weights denoting a strength of the relationship of the individual with the other individuals, each respective weight being associated with a unique individual of the other individuals; (ii) determining one or more weights of the respective weights that exceed a specified weight threshold; (iii) selecting an individual of the other individuals to which a weight of the one or more weights exceeding the specified weight threshold is associated; and (iv) ascertaining the at least one constraint for accessing the resource by the individual as being the one or more constraints for accessing the resource by the selected individual.

According to one embodiment of the present invention, the method shown in FIG. 3 may further comprise (the right branch): adding identification information between the individual and the valid entity; and using the added identification information to provide feedback to relationship network data where the individual is located. For example, a certain individual and valid entity B used to have no direct association but only an indirect association in the relationship network data; now that A builds an association with resources via B, an identifier may be added between A and B, and feedback is provided to the relationship network data by using the identifier, thereby strengthening relationship strength (or weight) between A and B in the relationship network data. In this manner, the relationship network data may be updated in real time, so as to increase the accuracy and efficiency for determining a valid entity subsequently.

Figure 5:
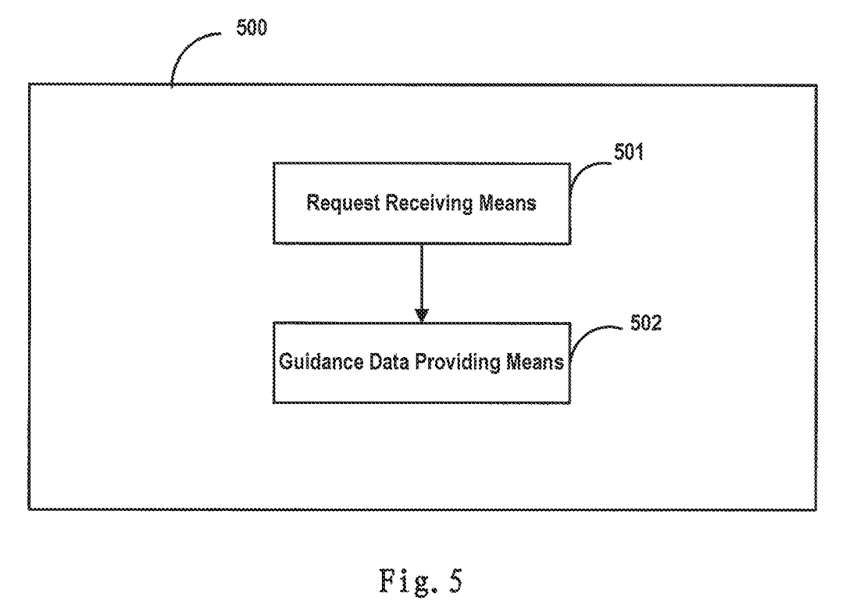
FIG. 5 shows a block diagram of a system for providing resource access according to one embodiment of the present invention.

FIG. 5 shows a block diagram of a system for providing resource access according to one embodiment of the present invention. The system shown in FIG. 5 is represented by a system 500 on the whole. Specifically, the system 500 comprises: request receiving means 501 configured to receive from an individual a resource access request; and guidance data providing means 502 configured to provide to the individual guidance data for accessing the resource based on role model data, so as to build an association between the individual and the resource, wherein the role model data comprise structured data that are generated by aggregating access data according to role attributes and behavior attributes. It may be understood that means 501 and 502 in system 500 correspond to step 201 and step 202 in the method shown in FIG. 2 respectively and thus are not detailed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for providing access to a computer system to execute a software test on the computer system in accordance with at least one constraint, said method comprising:
  receiving, by a processor of the computer system, a request from a first individual within an organization for the first individual to access the computer system to execute the software test on the computer system;
  in response to said receiving the request for the first individual to access the computer system to execute the software test on the computer system, said processor determining that the first individual has a specific role in the organization;
  in response to said determining that the first individual has the specific role in the organization, said processor identifying a candidate entity repository corresponding to the specific role, wherein all individuals having the specific role in the organization are entries in the candidate entity repository;
  said processor analyzing relationship network data, wherein the relationship network data includes a relationship weight between the first individual and each entry in the candidate entity repository, wherein each respective relationship weight denotes a strength of a relationship of the first individual with each entry in the candidate entity repository, wherein said analyzing comprises determining, for the first individual, valid entries from the entries in the candidate entity repository based on the relationship weight of each valid entry exceeding a preset relationship weight threshold, and wherein the valid entries in the candidate entity repository include a second individual and a third individual having the specific role in the organization;
  in response to the second individual and the third individual having been determined to be valid entries in the candidate entity repository, said processor ascertaining a first constraint for accessing the computer system to execute the software test on the computer system by the first individual, based on a second constraint for accessing the computer system to execute the software test on the computer system by the second individual and the third individual, wherein the second and third individuals are permitted to access the computer system to execute the software test on the computer system in accordance with the second constraint, wherein the second constraint includes, during each month, only a first and second period of time throughout which the second and third individuals are respectively permitted to access the computer system to execute the software test on the computer system, and wherein the first and second periods of time have an overlapping period of time that is common to the first and second periods of time;
  said processor aggregating the first and second periods of time, said aggregating comprising generating role model data that identifies the overlapping period of time, wherein the second constraint permits the second and third individuals to access the computer system to execute the software test on the computer system throughout the overlapping period of time, wherein the first period of time comprises a first interval of time not comprised by the second period of time, and wherein the second period of time comprises a second interval of time not comprised by the first period of time, wherein said ascertaining comprises ascertaining that the first constraint is that during each month the first individual is permitted to access the computer system to execute the software test on the computer system only during the overlapping period of time;
  after said generating role model data that identifies the overlapping period of time, said processor providing, to the first individual from whom the request to access the computer system to execute the software test was received, the generated role model data that identifies the overlapping period of time, wherein said providing, to the first individual, the role model data that identifies the overlapping period of time and said analyzing relationship network data are performed concurrently;
  said processor providing to the first individual access to the computer system to execute the software test on the computer system in accordance with the first constraint; and
  said processor executing, as initiated by the first individual during said access to the computer system by the first individual, the software test on the computer system in accordance with the first constraint.

2. A computer program product, comprising a computer readable hardware storage device having computer readable program code stored therein, said program code containing instructions which, upon being executed by a processor of a computer system, implement a method for providing access to the computer system to execute a software test on the computer system in accordance with at least one constraint, said method comprising:

said processor receiving a request from a first individual within an organization for the first individual to access the computer system to execute the software test on the computer system;

in response to said receiving the request for the first individual to access the computer system to execute the software test on the computer system, said processor determining that the first individual has a specific role in the organization;

in response to said determining that the first individual has the specific role in the organization, said processor identifying a candidate entity repository corresponding to the specific role, wherein all individuals having the specific role in the organization are entries in the candidate entity repository;

said processor analyzing relationship network data, wherein the relationship network data includes a relationship weight between the first individual and each entry in the candidate entity repository, wherein each respective relationship weight denotes a strength of a relationship of the first individual with each entry in the candidate entity repository, wherein said analyzing comprises determining, for the first individual, valid entries from the entries in the candidate entity repository based on the relationship weight of each valid entry exceeding a preset relationship weight threshold, and wherein the valid entries in the candidate entity repository include a second individual and a third individual having the specific role in the organization;

in response to the second individual and the third individual having been determined to be valid entries in the candidate entity repository, said processor ascertaining a first constraint for accessing the computer system to execute the software test on the computer system by the first individual, based on a second constraint for accessing the computer system to execute the software test on the computer system by the second individual and the third individual, wherein the second and third individuals are permitted to access the computer system to execute the software test on the computer system in accordance with the second constraint, wherein the second constraint includes, during each month, only a first and second period of time throughout which the second and third individuals are respectively permitted to access the computer system to execute the software test on the computer system, and wherein the first and second periods of time have an overlapping period of time that is common to the first and second periods of time;

said processor aggregating the first and second periods of time, said aggregating comprising generating role model data that identifies the overlapping period of time, wherein the second constraint permits the second and third individuals to access the computer system to execute the software test on the computer system throughout the overlapping period of time, wherein the first period of time comprises a first interval of time not comprised by the second period of time, and wherein the second period of time comprises a second interval of time not comprised by the first period of time, wherein said ascertaining comprises ascertaining that the first constraint is that during each month the first individual is permitted to access the computer system to execute the software test on the computer system only during the overlapping period of time;

after said generating role model data that identifies the overlapping period of time, said processor providing, to the first individual from whom the request to access the computer system to execute the software test was received, the generated role model data that identifies the overlapping period of time, wherein said providing, to the first individual, the role model data that identifies the overlapping period of time and said analyzing relationship network data are performed concurrently;

said processor providing to the first individual access to the computer system to execute the software test on the computer system in accordance with the first constraint; and said processor executing, as initiated by the first individual during said access to the computer system by the first individual, the software test on the computer system in accordance with the first constraint.

3. A computer system comprising a processor, a memory coupled to the processor, and a computer readable storage device coupled to the processor, said storage device containing program code configured to be executed by the processor via the memory to implement a method for providing access to the computer system to execute a software test on the computer system in accordance with at least one constraint, said method comprising:

said processor receiving a request from a first individual within an organization for the first individual to access the computer system to execute the software test on the computer system;

in response to said receiving the request for the first individual to access the computer system to execute the software test on the computer system, said processor determining that the first individual has a specific role in the organization;

in response to said determining that the first individual has the specific role in the organization, said processor identifying a candidate entity repository corresponding to the specific role, wherein all individuals having the specific role in the organization are entries in the candidate entity repository;

said processor analyzing relationship network data, wherein the relationship network data includes a relationship weight between the first individual and each entry in the candidate entity repository, wherein each respective relationship weight denotes a strength of a relationship of the first individual with each entry in the candidate entity repository, wherein said analyzing comprises determining, for the first individual, valid entries from the entries in the candidate entity repository based on the relationship weight of each valid entry exceeding a preset relationship weight threshold, and wherein the valid entries in the candidate entity repository include a second individual and a third individual having the specific role in the organization;

in response to the second individual and the third individual having been determined to be valid entries in the candidate entity repository, said processor ascertaining a first constraint for accessing the computer system to execute the software test on the computer system by the first individual, based on a second constraint for accessing the computer system to execute the software test on the computer system by the second individual and the third individual, wherein the second and third individuals are permitted to access the computer system to execute the software test on the computer system in accordance with the second constraint, wherein the second constraint includes, during each month, only a first and second period of time throughout which the second and third individuals are respectively permitted to access the computer system to execute the software test on the computer system, and wherein the first and second periods of time have an overlapping period of time that is common to the first and second periods of time;

said processor aggregating the first and second periods of time, said aggregating comprising generating role model data that identifies the overlapping period of time, wherein the second constraint permits the second and third individuals to access the computer system to execute the software test on the computer system throughout the overlapping period of time, wherein the first period of time comprises a first interval of time not comprised by the second period of time, and wherein the second period of time comprises a second interval of time not comprised by the first period of time, wherein said ascertaining comprises ascertaining that the first constraint is that during each month the first individual is permitted to access the computer system to execute the software test on the computer system only during the overlapping period of time;

after said generating role model data that identifies the overlapping period of time, said processor providing, to the first individual from whom the request to access the computer system to execute the software test was received, the generated role model data that identifies the overlapping period of time, wherein said providing, to the first individual, the role model data that identifies the overlapping period of time and said analyzing relationship network data are performed concurrently;

said processor providing to the first individual access to the computer system to execute the software test on the computer system in accordance with the first constraint; and said processor executing, as initiated by the first individual during said access to the computer system by the first individual, the software test on the computer system in accordance with the first constraint.

\* \* \* \* \*